(12) United States Patent
Saito et al.

(10) Patent No.: US 11,569,699 B2
(45) Date of Patent: Jan. 31, 2023

(54) HOLDER, ROTOR, MOTOR, AND METHOD FOR MANUFACTURING ROTOR

(71) Applicant: Nidec Corporation, Kyoto (JP)

(72) Inventors: Yuya Saito, Kyoto (JP); Hideo Fujiwara, Kyoto (JP); Akira Ichien, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 171 days.

(21) Appl. No.: 17/008,711

(22) Filed: Sep. 1, 2020

(65) Prior Publication Data
US 2021/0099038 A1 Apr. 1, 2021

(30) Foreign Application Priority Data

Sep. 30, 2019 (JP) .............................. JP2019-178397

(51) Int. Cl.
| | | |
|---|---|---|
| *H02K 1/27* | (2022.01) | |
| *H02K 1/28* | (2006.01) | |
| *H02K 1/276* | (2022.01) | |
| *H02K 15/03* | (2006.01) | |
| *B29C 39/10* | (2006.01) | |
| *B29C 39/02* | (2006.01) | |
| *H02K 15/12* | (2006.01) | |
| *B29L 31/00* | (2006.01) | |

(52) U.S. Cl.
CPC .............. *H02K 1/28* (2013.01); *B29C 39/026* (2013.01); *B29C 39/10* (2013.01); *H02K 1/276* (2013.01); *H02K 15/03* (2013.01); *H02K 15/12* (2013.01); *B29L 2031/7498* (2013.01)

(58) Field of Classification Search
CPC .......... H02K 1/28; H02K 1/276; H02K 15/03; H02K 15/12; H02K 1/04; H02K 2201/06; H02K 2213/03; H02K 1/278; H02K 1/30; B29C 39/026; B29C 39/10; B29L 2031/7498
See application file for complete search history.

(56) References Cited

U.S. PATENT DOCUMENTS

| | | | | |
|---|---|---|---|---|
| 2013/0002081 | A1* | 1/2013 | Zhang | .................. H02K 21/024 310/156.53 |
| 2019/0386528 | A1* | 12/2019 | Lee | ......................... H02K 1/27 |

FOREIGN PATENT DOCUMENTS

| | | | |
|---|---|---|---|
| JP | 2001157394 | A * | 6/2001 |
| JP | 3482365 | B2 | 12/2003 |

OTHER PUBLICATIONS

Machine Translation, Nakahara , JP 2001157394 A, Jun. 8, 2001. (Year: 2001).*

* cited by examiner

*Primary Examiner* — Thomas Truong
(74) *Attorney, Agent, or Firm* — Keating & Bennett, LLP

(57) ABSTRACT

A rotor includes a rotor core, a first magnet, a second magnet, and a holder made of resin. Both a radially inner surface and a radially outer surface of the first magnet are covered with the rotor core. The second magnet includes a radially inner surface covered with the rotor core, and a radially outer surface exposed from the rotor core. The holder includes a first inner pressing portion and a second inner pressing portion. The first inner pressing portion presses the first magnet radially outward from a radially inner side of the first magnet. The second inner pressing portion presses the second magnet radially outward from a radially inner side of the second magnet. Accordingly, the first magnet and the second magnet are accurately positioned for the rotor core.

19 Claims, 9 Drawing Sheets

HOLDER, ROTOR, MOTOR, AND METHOD FOR MANUFACTURING ROTOR

CROSS REFERENCE TO RELATED APPLICATION

The present application claims priority under 35 U.S.C. § 119 to Japanese Application No. 2019-178397 filed on Sep. 30, 2019, the entire contents of which are hereby incorporated herein by reference.

1. FIELD

The present disclosure relates to a holder, a rotor, a motor, and a method for manufacturing a rotor.

2. BACKGROUND

Hitherto, a motor so-called an inner rotor type in which a rotor is arranged inside a stator is known. A rotor used in the inner rotor motor has a rotor core, which is a cylindrical magnetic body, and a plurality of magnets.

SUMMARY

A first aspect of an example embodiment of the present application is a holder made of resin to position a rotor core which is annular and centered about a central axis, a first magnet in which both a radially inner surface and a radially outer surface are covered with the rotor core, and a second magnet in which a radially inner surface is covered with the rotor core and a radially outer surface is exposed from the rotor core. The holder includes a first inner pressing portion to press the first magnet radially outward from a radially inner side of the first magnet, and a second inner pressing portion to press the second magnet radially outward from a radially inner side of the second magnet.

A second aspect of an example embodiment of the present application provides a method for manufacturing a rotor used in a motor. The method includes a first process of arranging, inside a mold, a rotor core, a plurality of first magnets in each of which both a radially inner surface and a radially outer surface are covered with the rotor core, and a plurality of second magnets in each of which a radially inner surface is covered with the rotor core and a radially outer surface is exposed from the rotor core, a second process of pouring resin which is molten into the mold, a third process curing the resin inside the mold to obtain a holder made of resin, and a fourth process of releasing, from the mold, a rotor including the rotor core, the plurality of first magnets, the plurality of second magnets, and the holder. The rotor core includes a first groove extending in an axial direction on a radially inner side of corresponding one of the first magnets, and a second groove extending in the axial direction on a radially inner side of corresponding one of the second magnets, and in the second process, the resin which is molten flows into the first groove and the second groove.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings. In the present application, a direction parallel to a central axis of a motor is referred to as an "axial direction", a direction orthogonal to the central axis of the motor is referred to as a "radial direction", and a direction along an arc centered on the central axis of the motor is referred to as a "circumferential direction", respectively. Further, in the present application, the shape of each member and the positional relationship between the respective components will be described with the axial direction as an up-down direction and the cover side of the housing as a top. However, the definition of the up-down direction is not intended to be limited to the orientation of the motor according to the present disclosure during manufacturing and during use.

The "parallel direction" described above also includes a substantially parallel direction. In addition, the "orthogonal direction" described above also includes a substantially orthogonal direction.

Figure 1:
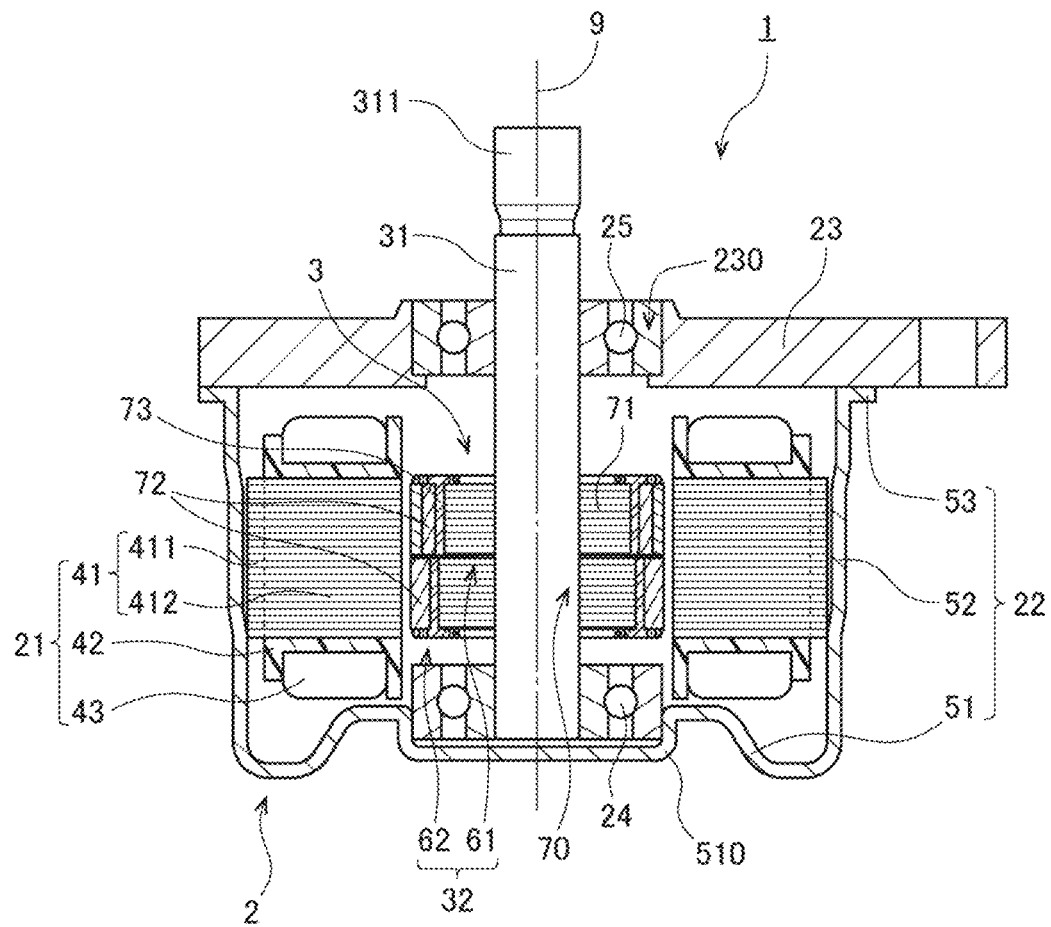
FIG. 1 is a longitudinal sectional view of a motor.

FIG. 1 is a longitudinal sectional view of a motor 1 according to an example embodiment of the present disclosure.

The motor 1 is mounted on, for example, an automobile, and used as a driving source for generating driving force of an electric power steering device. However, the motor of the present disclosure may be used for applications other than the power steering device. The motor of the present disclosure may be used as a driving source for other devices for the automobile, for example, a transmission device, a brake device, a traction motor device, an engine cooling fan, and an oil pump. In addition, the motor of the present disclosure may be installed in household electric appliances, OA apparatuses, medical appliances, and the like to generate various driving forces.

As illustrated in FIG. 1, the motor 1 includes a stationary portion 2 and a rotating portion 3. The stationary portion 2 is fixed to a frame body of a device to be driven. The rotating portion 3 is rotatably supported to the stationary portion 2.

The stationary portion 2 of the present example embodiment includes a stator 21, a housing 22, a cover 23, a lower bearing 24, and an upper bearing 25.

The stator 21 is an armature that generates a rotating magnetic field responding to a drive current. The stator 21 has an annular outer shape centered on a central axis 9. The stator 21 includes a stator core 41, a plurality of insulators 42, and a plurality of coils 43.

The stator core 41 is formed of laminated steel sheets in which magnetic steel sheets are laminated in the axial direction. The stator core 41 has an annular core back 411 and a plurality of teeth 412 protruding inward in the radial direction from the core back 411. The core back 411 is arranged substantially coaxially with the central axis 9. The plurality of teeth 412 are arranged at substantially equal intervals in the circumferential direction.

The insulator 42 is made of resin that is an insulating material. At least a part of a surface of the stator core 41 is covered with the insulator 42. Specifically, of the surface of the stator core 41, at least an upper surface, a lower surface, and both end surfaces in the circumferential direction of each tooth 412 are covered with the insulator 42.

The coil 43 is formed of a conductive wire wound around the insulator 42. That is, in the present example embodiment, the conducting wire is wound around the tooth 412 serving as a magnetic core with the insulator 42 in between. The insulator 42 is interposed between the tooth 412 and the coil 43 to prevent the tooth 412 and the coil 43 from being electrically short-circuited.

The housing 22 is a bottomed cylindrical container. The housing 22 is obtained, for example, by pressing a metal plate such as aluminum, stainless steel, or the like. Note that the method for manufacturing the housing 22 is not limited to the press working, and other working methods such as die-casting may be employed. Further, the housing 22 is not limited to being made of metal, and may be made of resin. When the housing 22 is made of resin, various resin molding methods such as insert molding in which the respective members of the stator 21 are inserted into the housing 22 can be used. The stator 21 and a rotor 32 described later are housed inside the housing 22. As illustrated in FIG. 1, the housing 22 has a bottom plate portion 51, a side wall portion 52, and a flange portion 53.

The bottom plate portion 51 extends substantially perpendicularly to the central axis 9 below the stator 21 and the rotor 32. A lower bearing holding portion 510 that is recessed downward is provided in a center of the bottom plate portion 51. The side wall portion 52 extends in a cylindrical shape from a radially outer end portion of the bottom plate portion 51 toward an upper side. The stator core 41 is fixed to an inner peripheral surface of the side wall portion 52. The flange portion 53 extends radially outward from an upper end portion of the side wall portion 52.

The cover 23 is a plate-shaped member that covers an upper portion of the housing 22. The cover 23 extends substantially perpendicularly to the central axis 9 above the stator 21 and the rotor 32. A material of the cover 23 is made of metal, for example. The cover 23 is fixed to the flange portion 53 of the housing 22 by, for example, welding. However, the cover 23 may have a shape other than the plate shape. Further, the cover 23 may be made of resin. As illustrated in FIG. 1, an upper bearing holding hole 230 is provided in the center of the cover 23. The upper bearing holding hole 230 penetrates through the cover 23 in the axial direction.

The lower bearing 24 and the upper bearing 25 are arranged between the housing 22 and the cover 23, and a shaft 31 on the rotating portion 3 side, respectively. The lower bearing 24 is located below the rotor 32, which will be described later. The upper bearing 25 is located above the rotor 32, which will be described later.

For example, a ball bearing for relatively rotating an outer ring and an inner ring with a plurality of spheres therebetween is used for the lower bearing 24 and the upper bearing 25. The outer ring of the lower bearing 24 is fixed to the lower bearing holding portion 510 of the housing 22. The outer ring of the upper bearing 25 is fixed to an edge of the upper bearing holding hole 230 of the cover 23. Further, the inner ring of each of the lower bearing 24 and the upper bearing 25 is fixed to the shaft 31. Accordingly, the shaft 31 is rotatably supported to the housing 22 and the cover 23. However, instead of the ball bearing, another type of bearing, such as a slide bearing, a fluid bearing, or the like, may be used.

The rotating portion 3 of the present example embodiment includes the shaft 31 and the rotor 32.

The shaft 31 is a columnar member that extends along the central axis 9. A material of the shaft 31 is made of metal such as stainless steel, for example. The shaft 31 is supported by the lower bearing 24 and the upper bearing 25, thereby being rotated about the central axis 9. Further, an upper end portion 311 of the shaft 31 protrudes above the cover 23. A device to be driven is connected to the upper end portion 311 of the shaft 31 through a power transmission mechanism such as a gear.

Note that the shaft 31 does not necessarily have to protrude above the cover 23. That is, a through-hole may be provided in the bottom plate portion 51 of the housing 22, and a lower end portion of the shaft 31 may protrude below the bottom plate portion 51 through the through-hole. In addition, the shaft 31 may be a hollow member.

The rotor 32 is located inside the stator 21 in the radial direction and rotates together with the shaft 31 about the central axis 9. The rotor 32 includes a first rotor 61 and a second rotor 62. The first rotor 61 and the second rotor 62 are arranged adjacent to each other in the axial direction. Each of the first rotor 61 and the second rotor 62 includes a rotor core 71, a plurality of magnets 72, and a holder 73.

The rotor core 71 is made of a magnetic material. The rotor core 71 has a through-hole 70 extending in the axial direction at the center thereof. The shaft 31 is press-fitted into the through-hole 70 of the rotor core 71. As a result, the rotor core 71 and the shaft 31 are fixed to each other.

The plurality of magnets 72 is located on an outer peripheral surface of the rotor core 71 or inside the rotor core 71. A radially outer surface of each magnet 72 serves as a magnetic pole surface facing a radially inner end surface of the tooth 412. The plurality of magnets 72 are arranged in the circumferential direction so that N poles and S poles are alternately arranged. The holder 73 is a resin member for fixing the magnets 72 to the rotor core 71.

When a drive current is supplied to the coil 43, the rotating magnetic field is generated in the plurality of teeth 412 of the stator core 41. Then, torque in the circumferential direction is generated due to magnetic attractive force and repulsive force between the teeth 412 and the magnets 72. As a result, the rotating portion 3 rotates about the central axis 9 for the stationary portion 2.

Next, a more detailed structure of the rotor 32 will be described.

Figure 2:
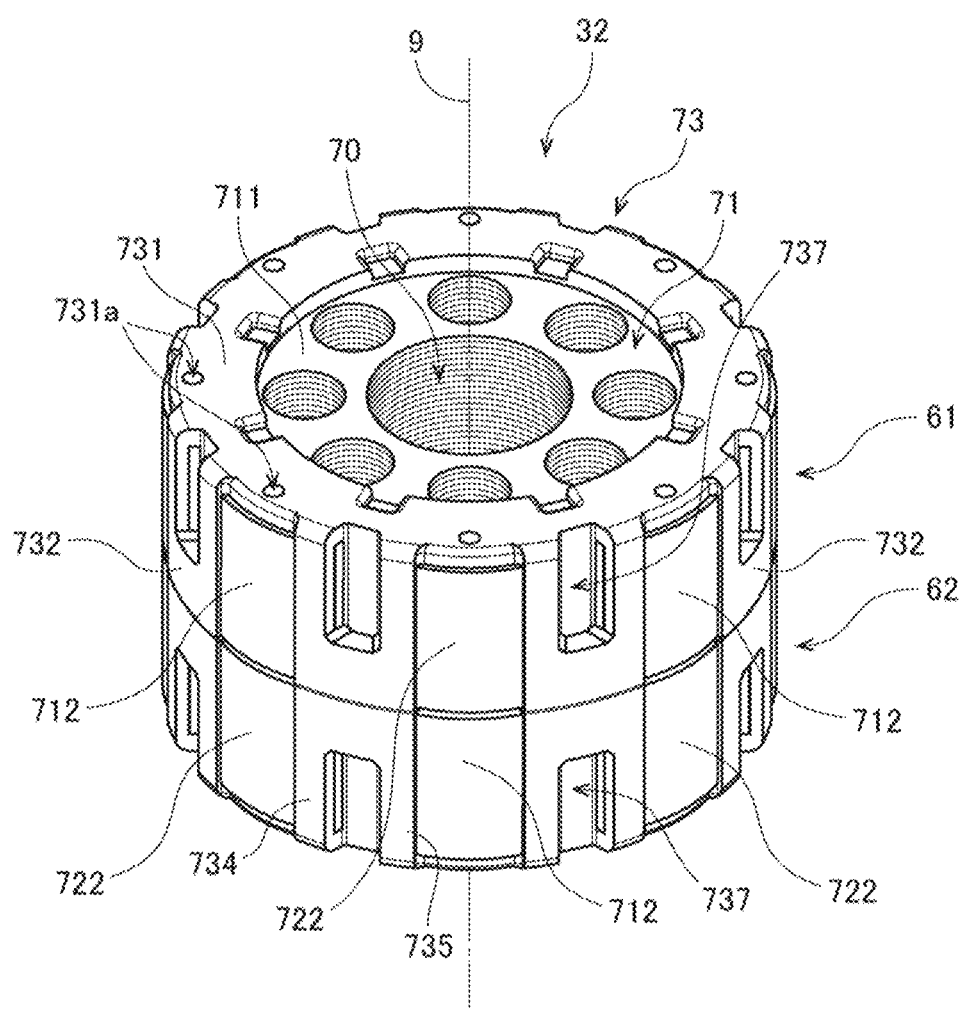
FIG. 2 is a perspective view of a rotor.

FIG. 2 is a perspective view of the rotor 32. As illustrated in FIG. 2, the rotor 32 includes the first rotor 61 and the second rotor 62 located below the first rotor 61. The first rotor 61 and the second rotor 62 are fixed to the shaft 31, respectively. The first rotor 61 and the second rotor 62 have the same structure. However, the first rotor 61 and the second rotor 62 are arranged upside down in a state that circumferential positions of the magnets 72 are shifted each other.

Hereinafter, the structure of the first rotor 61 will be described. The structure of the second rotor 62 is the same as that of the first rotor 61, and therefore, a description thereof will be omitted.

Figure 3:
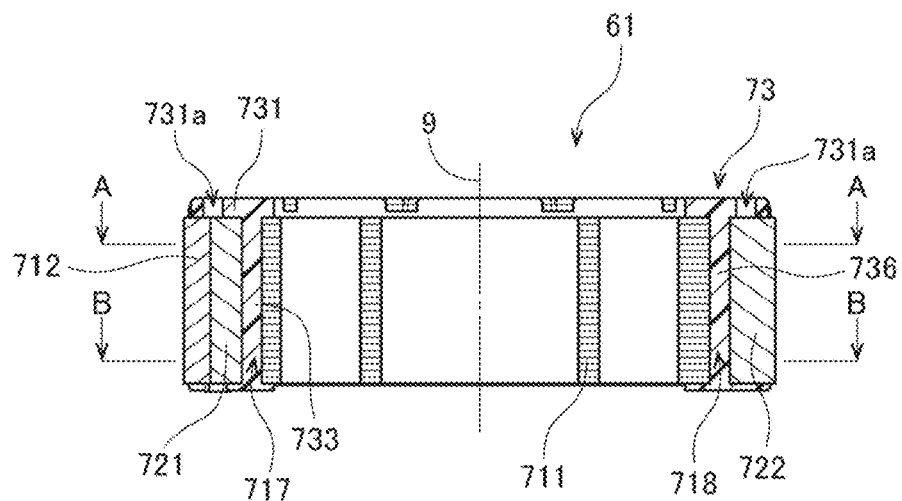
FIG. 3 is a longitudinal sectional view of a first rotor.
Figure 4:
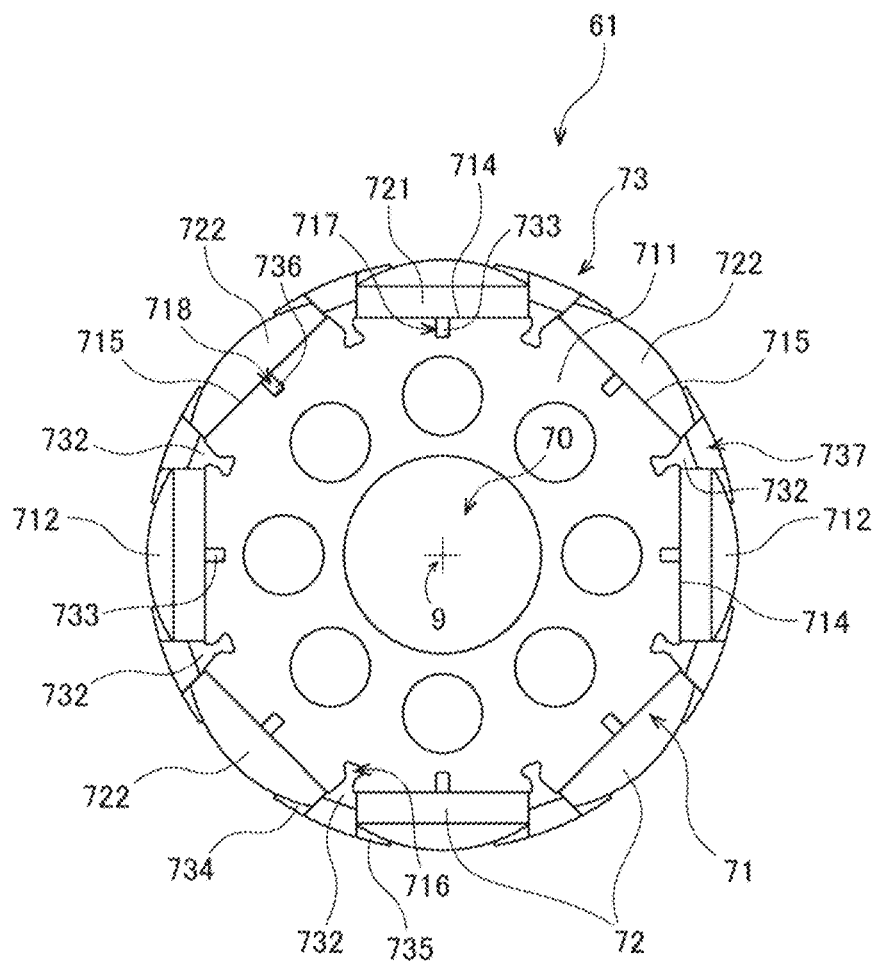
FIG. 4 is a cross-sectional view of the first rotor taken along a line A-A of FIG. 3.
Figure 5:
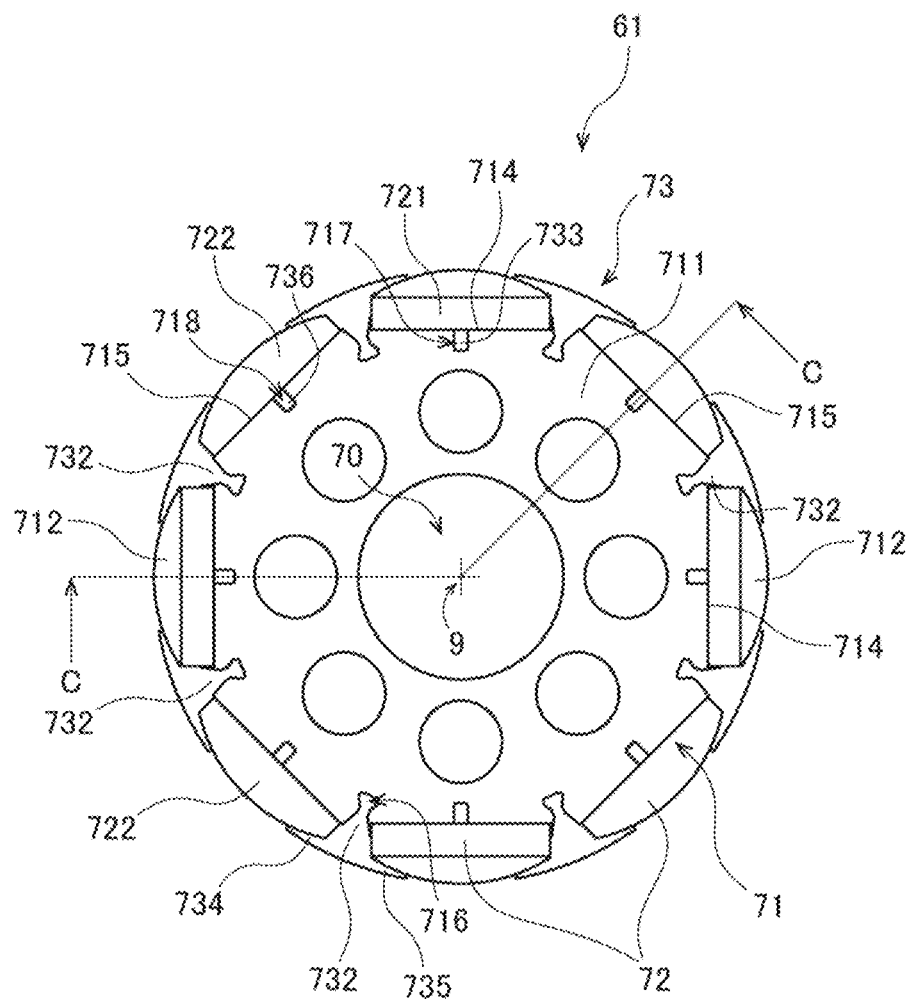
FIG. 5 is a cross-sectional view of the first rotor taken along a line B-B of FIG. 3.
Figure 6:
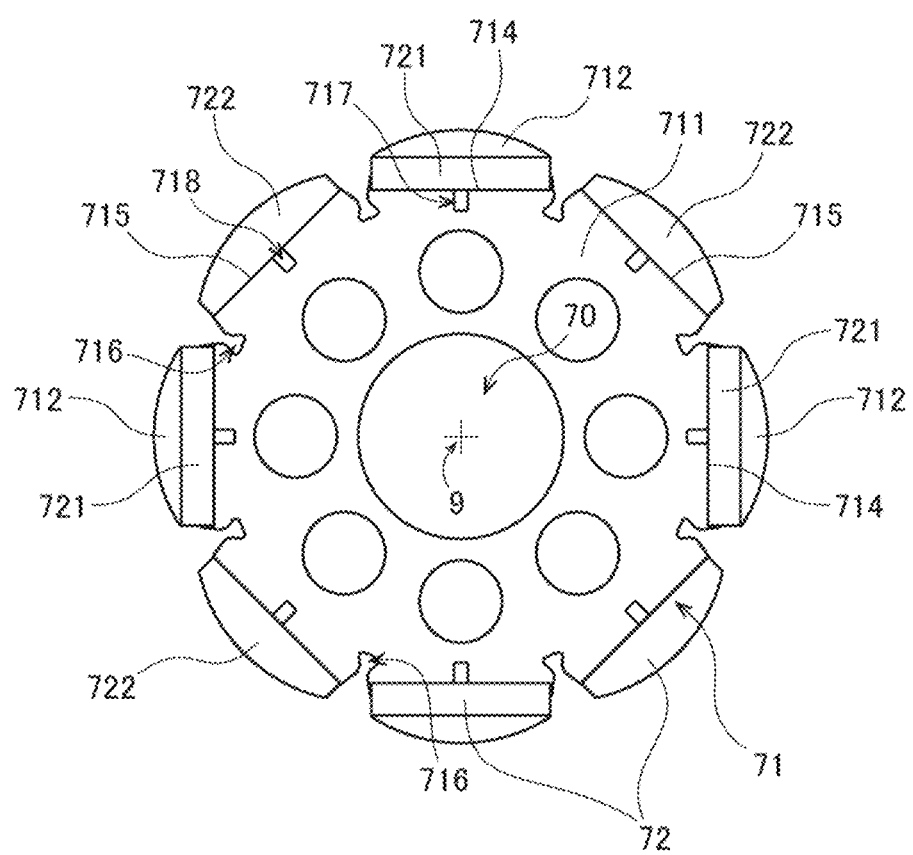
FIG. 6 is a cross-sectional view of a rotor core and a plurality of magnets taken along the line B-B in FIG. 3.

FIG. 3 is a longitudinal sectional view of the first rotor 61. FIG. 4 is a cross-sectional view of the first rotor 61 taken along a line A-A in FIG. 3. FIG. 5 is a cross-sectional view of the first rotor 61 taken along a line B-B in FIG. 3. FIG. 6 is a cross-sectional view of the rotor core 71 and the plurality of magnets 72 taken along the line B-B in FIG. 3. Note that FIG. 3 is a longitudinal sectional view of the first rotor 61 taken along a line C-C in FIG. 5. Further, in FIGS. 4 to 6, hatching lines showing a cross section are omitted in order to avoid complication of the drawings.

As illustrated in FIGS. 3 to 6, the first rotor 61 includes the rotor core 71, the plurality of magnets 72, and the holder 73.

The rotor core 71 includes one main core 711 and four sub cores 712. The main core 711 is formed of the laminated steel sheets in which the magnetic steel sheets are laminated in the axial direction. The main core 711 is located radially inside the plurality of magnets 72. The main core 711 has an annular outer shape centered on the central axis 9. In a center of the main core 711, the above-described through-hole 70 is provided.

The sub core 712 is a magnetic body that is independent from the main core 711. For example, iron is used as a material of the sub core 712. Similarly to the main core 711, the sub core 712 may be formed of the laminated steel sheets. The four sub cores 712 are arranged at equal intervals in the circumferential direction on the outer side in the radial direction relative to the main core 711. A radially inner surface of each sub core 712 is a flat surface that is perpendicular to the radial direction. A radially outer surface of each sub core 712 is an arcuate convex curved surface in a top view.

The main core 711 according to the present example embodiment has a substantially octagonal shape in a top view. An outer peripheral surface of the main core 711 has four first holding surfaces 714 and four second holding surfaces 715. The first holding surfaces 714 and the second holding surfaces 715 are alternately arranged in the circumferential direction.

A first holding surface 714 is a surface of the outer peripheral surface of the main core 711, which is located on the inner side in the radial direction of the sub core 712 and the first magnet 721, which will be described later. The first holding surface 714 extends substantially perpendicularly to the radial direction. The second holding surface 715 is a surface of the outer peripheral surface of the main core 711, which is located on the inner side in the radial direction of a second magnet 722, which will be described later. The second holding surface 715 extends substantially perpendicularly to the radial direction.

Further, the main core 711 has eight boundary grooves 716, four first grooves 717, and four second grooves 718. The boundary groove 716 is a groove that is recessed inward in the radial direction from a portion between the first holding surface 714 and the second holding surface 715 of the outer peripheral surface of the main core 711. The boundary groove 716 extends linearly in the axial direction from the upper end portion to the lower end portion of the rotor core 71.

The first groove 717 is a groove that is recessed inward in the radial direction from the first holding surface 714. The first groove 717 extends linearly in the axial direction from the upper end portion to the lower end portion of the main core 711. The first groove 717 is located at a center in the circumferential direction of the first holding surface 714. The second groove 718 is a groove that is recessed inward in the radial direction from the second holding surface 715. The second groove 718 extends linearly in the axial direction from the upper end portion to the lower end portion of the main core 711. The second groove 718 is located at a center in the circumferential direction of the second holding surface 715.

The plurality of magnets 72 include four first magnets 721 and four second magnets 722. The first magnets 721 and the second magnets 722 are alternately arranged in the circumferential direction.

The first magnet 721 is a permanent magnet having a rectangular shape in a top view. A radially inner surface and a radially outer surface of the first magnet 721 are flat surfaces that are perpendicular to the radial direction. The first magnet 721 is arranged radially outward of the first holding surface 714 and radially inward of the sub core 712. Therefore, the radially inner surface of the first magnet 721 is covered with the first holding surface 714 of the main core 711. Further, the radially outer surface of the first magnet 721 is covered with the sub core 712.

The second magnet 722 is a permanent magnet located between the first magnets 721 that are adjacent to each other in the circumferential direction. A radially inner surface of the second magnet 722 is a flat surface perpendicular to the radial direction. The radially outer surface of the second magnet 722 is an arcuate convex curved surface in a top view. The second magnet 722 is fixed to the second holding surface 715. Therefore, the radially inner surface of the second magnet 722 is covered with the second holding surface 715 of the main core 711. Further, a radially outer surface of the second magnet 722 is exposed from the rotor core 71.

The radially outer surface of the first magnet 721 and the radially outer surface of the second magnet 722 have opposite polarities. That is, when the radially outer surface of the first magnet 721 has an N-pole, the radially outer surface of the second magnet 722 has an S-pole. However, the magnetic poles of the first magnet 721 and the second magnet 722 of the first rotor 61 and the magnetic poles of the first magnet 721 and the second magnet 722 of the second rotor 62 have opposite polarities. For example, in the first rotor 61, when the radially outer surface of the first magnet 721 is the N pole and the radially outer surface of the second magnet 722 is the S pole, in the second rotor 62, the radially outer surface of the first magnet 721 is the S pole, and the radially outer surface of the second magnet 722 is the N pole.

Further, as illustrated in FIG. 2, in the present example embodiment, the positions of the first magnet 721 and the second magnet 722 in the first rotor 61 in the circumferential direction are different from the positions of the first magnet 721 and the second magnet 722 in the second rotor 62 in the circumferential direction. Specifically, the second magnet 722 of the second rotor 62 is arranged below the first magnet 721 and the sub core 712 of the first rotor 61. Further, the first magnet 721 and the sub core 712 of the second rotor 62 are arranged below the second magnet 722 of the first rotor 61. Thereby, the difference in magnetic characteristics between the first magnet 721 and the second magnet 722 is canceled out as a whole of the rotor 32. As a result, cogging and torque ripple when the motor 1 is driven can be reduced.

The holder 73 is a resin member that positions the four first magnets 721 and the four second magnets 722 for the rotor core 71. As will be described later, the holder 73 is molded by pouring molten resin into the mold 80 in a state in which the main core 711, the four sub cores 712, the four first magnets 721, and the four second magnets 722 are arranged in an inside of a mold 80 in advance. That is, the holder 73 is a resin molded member having the main core 711, the four sub cores 712, the four first magnets 721, and the four second magnets 722 as insert components.

As illustrated in FIGS. 2 to 5, the holder 73 has a ring portion 731, eight outer columnar portions 732, four first inner pressing portions 733, and four second inner pressing portions 736.

The ring portion 731 is located at an end portion of the holder 73 in the axial direction. The ring portion 731 has an annular shape centered on the central axis 9. The ring portion 731 is in contact with end surfaces of the four first magnets 721 and the four second magnets 722 in the axial direction. The first rotor 61 is fixed to the shaft 31 in a posture in which the ring portion 731 is located on the upper side. The second rotor 62 is fixed to the shaft 31 in a posture in which the ring portion 731 is located on the lower side. Therefore, in the rotor 32 constituted by the first rotor 61 and the second rotor 62, the ring portions 731 are arranged at the upper end portion and the lower end portion in the axial direction. That is, the plurality of magnets 72 are sandwiched between the pair of ring portions 731 in the axial direction. Accordingly, the plurality of magnets 72 are prevented from jumping out in the axial direction.

As illustrated in FIGS. 2 and 3, the ring portion 731 has a hole portion 731a penetrating therethrough in the axial direction. The number of the holes 731a is the same as that of the plurality of magnets 72. The hole portion 731a is provided at a position overlapping with each of the plurality of magnets 72 in the axial direction. Therefore, a part of one end surface of the first magnet 721 in the axial direction and a part of one end surface of the second magnet 722 in the axial direction are exposed in the hole portions 721a, respectively. Note that the hole portion 731a may have a groove shape extending to the outside in the radial direction.

The eight outer columnar portions 732 extend in the axial direction from the ring portion 731. Each of the outer columnar portions 732 is located between the first magnet 721 and the second magnet 722. The radially inner end of the outer columnar portion 732 is located in the boundary groove 716. Further, the radially outer end portion of the outer columnar portion 732 extends toward both sides in the circumferential direction. That is, the radially outer end portion of the outer columnar portion 732 has a first covering portion 734 extending toward the one side in the circumferential direction, and a second covering portion 735 extending toward another side in the circumferential direction.

The first covering portion 734 extends in a columnar shape along the axial direction on the radially outer side of the end portion in the circumferential direction of the second magnet 722. The radially inner surface of the first covering portion 734 is in contact with the radially outer surface of the circumferential end portion of the second magnet 722. The first covering portion 734 prevents the second magnet 722 from being jumped outward in the radial direction due to centrifugal force when the motor 1 is driven.

The second covering portion 735 extends in a columnar shape along the axial direction on the radially outer side of the circumferential end portion of the sub core 712. The radially inner surface of the second covering portion 735 is in contact with the radially outer surface of the circumferential end portion of the sub core 712. The second covering portion 735 prevents the sub core 712 from being jumped outward in the radial direction due to centrifugal force when the motor 1 is driven.

As illustrated in FIGS. 2 and 4, the outer columnar portion 732 of the present example embodiment has a recessed portion 737. The recessed portion 737 is recessed radially inward from a portion of the radially outer side surface of the outer columnar portion 732 in the axial direction. The recessed portion 737 is located between the sub core 712 and the first magnet 721, and the second magnet 722. The circumferential end surface of the sub core 712, the circumferential end surface of the first magnet 721, and the circumferential end surface of the second magnet 722 are exposed to the recessed portion 737.

The four first inner pressing portions 733 extend in the axial direction from the ring portion 731. Each of the first inner pressing portions 733 is located inside the first groove 717 located on the inner side in the radial direction of the first magnet 721. Therefore, the first inner pressing portion 733 extends in a columnar shape along the axial direction on the inner side in the radial direction of the first magnet 721. The radially outer end portion of the first inner pressing portion 733 is in contact with the radially inner surface of the first magnet 721. The first inner pressing portion 733 serves to press the first magnet 721 radially outward and to position the first magnet 721 during injection molding of the holder 73 which will be described later.

The four second inner pressing portions 736 extend in the axial direction from the ring portion 731. Each of the second inner pressing portions 736 is located inside the second groove 718 located on the inner side in the radial direction of the second magnet 722. Therefore, the second inner pressing portion 736 extends in a columnar shape along the axial direction on the inner side in the radial direction of the second magnet 722. The radially outer end portion of the second inner pressing portion 736 is in contact with the radially inner surface of the second magnet 722. The second inner pressing portion 736 serves to press the second magnet 722 radially outward and to position the second magnet 722 during injection molding of the holder 73 which will be described later.

Method for manufacturing Rotor Next, a method for manufacturing the first rotor 61 will be described. FIGS. 7 to 10 are longitudinal sectional views illustrating states in which the first rotor 61 is manufactured. Note that the manufacturing procedure of the second rotor 62 is the same as that of the first rotor 61, and therefore, a description thereof will be omitted.

Figure 7:
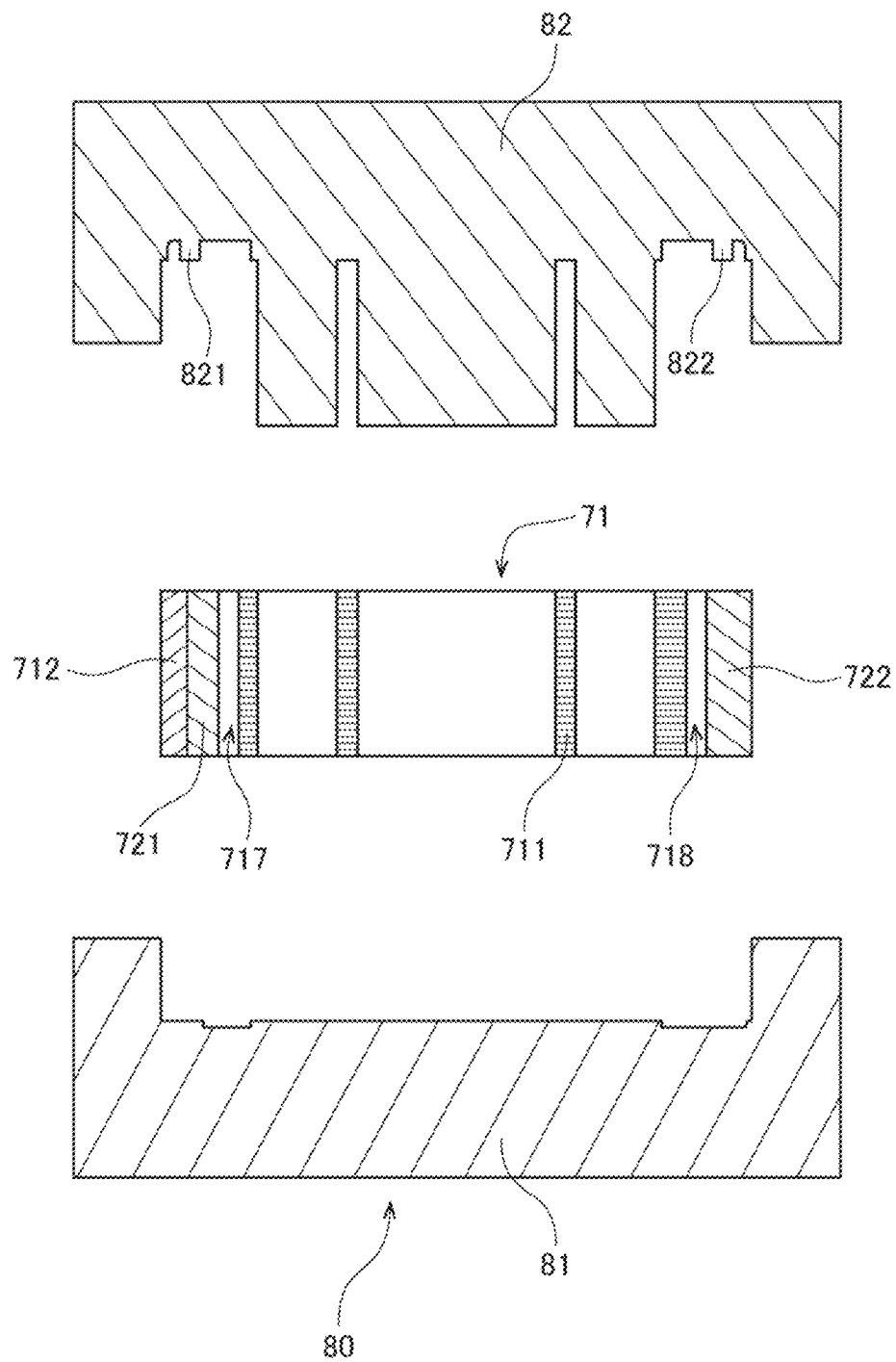
FIG. 7 is a longitudinal sectional view illustrating a state in which the first rotor is manufactured.

When manufacturing the first rotor 61, as illustrated in FIG. 7, the mold 80, the main core 711, the four sub cores 712, the four first magnets 721, and the four second magnets 722 are prepared first. The mold 80 includes a first mold 81 and a second mold 82. The first mold 81 and the second mold 82 have inner surfaces corresponding to the outer shape of the first rotor 61 after manufacturing.

Figure 8:
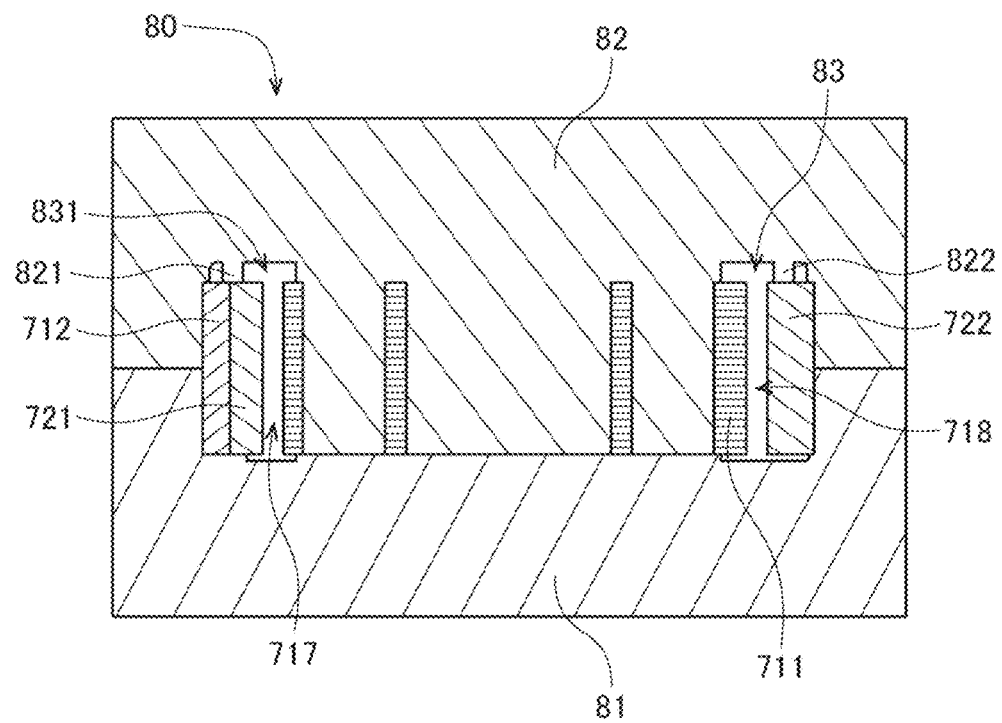
FIG. 8 is a longitudinal sectional view illustrating a state in which the first rotor is manufactured.

Next, as illustrated in FIG. 8, the main core 711, the four sub cores 712, the four first magnets 721, and the four second magnets 722 are arranged inside the mold 80 (first process). Here, the main core 711, the four sub cores 712, the four first magnets 721, and the four second magnets 722 are first arranged inside the first mold 81. The four first magnets 721 are arranged outside the first holding surfaces 714 of the main core 711 in the radial direction, respectively. In addition, the four sub cores 712 are arranged outside the first magnets 721 in the radial direction, respectively. Further, the four second magnets 722 are arranged outside the second holding surfaces 715 of the main core 711 in the radial direction, respectively.

Then, the first mold 81 is covered with the second mold 82 to close the mold 80. Accordingly, as illustrated in FIG. 8, a cavity 83 is formed inside the mold 80, and the main core 711, the four sub cores 712, the four first magnets 721, and the four second magnets 722 are arranged in the cavity 83.

Note that the second mold 82 has four first positioning pins 821 and four second positioning pins 822. In the state illustrated in FIG. 8, each of the first positioning pins 821 is in contact with both the first magnet 721 and the sub core 712. As a result, the first magnet 721 and the sub core 712 are accurately positioned in the axial direction. Further, each of the second positioning pins 822 is in contact with the second magnet 722. As a result, the second magnet 722 is accurately positioned in the axial direction. Note that the first positioning pin 821 and the second positioning pin 822 may extend outward in the radial direction, and may be connected to a side wall portion of the second mold 82.

In the present example embodiment, the second mold 82 has eight convex portions (not illustrated) corresponding to the above-described recessed portions 737. The convex portion protrudes inward in the radial direction from the inner surface of the second mold 82. In the first process illustrated in FIG. 8, the circumferential end surface of the sub core 712, the circumferential end surface of the first magnet 721, and the circumferential end surface of the second magnet 722 are in contact with the circumferential end surfaces of the convex portion of the second mold 82, respectively. Thereby, the four sub cores 712, the four first magnets 721, and the four second magnets 722 are positioned in the circumferential direction, respectively.

Figure 9:
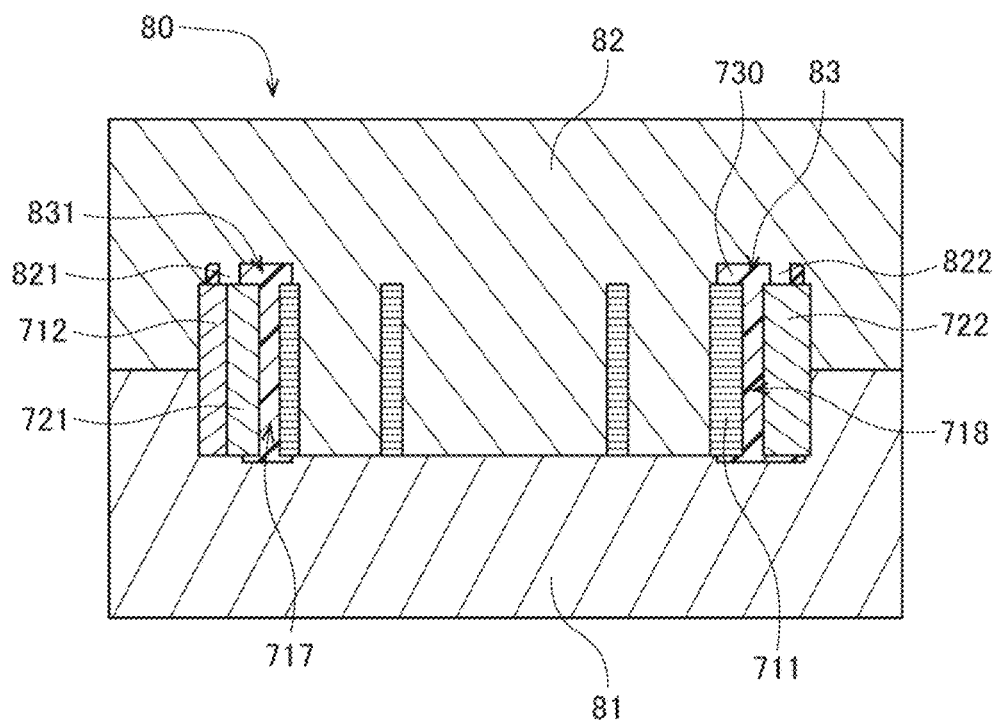
FIG. 9 is a longitudinal sectional view illustrating a state in which the first rotor is manufactured.

Subsequently, as illustrated in FIG. 9, the molten resin 730 is poured into the cavity 83 inside the mold 80 (second process). Here, the molten resin 730 is poured into the cavity 83 in the mold 80 from a gate (not illustrated) provided in the first mold 81 or the second mold 82.

At this time, a part of the molten resin 730 flows into an annular space 831 provided in the second mold 82. Then, the molten resin 730 filled in the space 831 presses the end surfaces of the first magnet 721 and the second magnet 722 in the axial direction. Thereby, the first magnet 721 and the second magnet 722 are pressed in the axial direction toward the first mold 81. As a result, the first magnet 721 and the second magnet 722 are positioned in the axial direction, respectively.

Further, another part of the molten resin 730 flows into the four first grooves 717 of the rotor core 71. Then, the molten resin 730 filled in the first groove 717 presses the inner surface of the first magnet 721 in the radial direction. Thereby, the first magnet 721 and the sub core 712 are pressed outward in the radial direction toward the inner surface of the mold 80. As a result, the first magnet 721 and the sub core 712 are positioned in the radial direction.

Further, still another part of the molten resin 730 flows into the four second grooves 718 of the rotor core 71. Then, the molten resin 730 filled in the second groove 718 presses the inner surface of the second magnet 722 in the radial direction. Thereby, the second magnet 722 is pressed outward in the radial direction toward the inner surface of the mold 80. As a result, the second magnet 722 is positioned in the radial direction.

When the cavity 83 is filled with the molten resin 730 inside the mold 80, subsequently, the molten resin 730 inside the mold 80 is cooled and cured. The molten resin 730 inside the mold 80 is cured to become the holder 73 (third process). In addition, as the molten resin 730 is cured, the main core 711, the four sub cores 712, the four first magnets 721, the four second magnets 722, and the holder 73 are fixed to one another.

The molten resin 730 that has flowed into the annular space 831 described above becomes the ring portion 731 by being cured. The molten resin 730 that has flowed into the first groove 717 becomes the first inner pressing portion 733 by being cured. The molten resin 730 that has flowed into the second groove 718 becomes the second inner pressing portion 736 by being cured. The molten resin 730 that has flowed into the portion between the sub core 712 and the first magnet 721, and the second magnet 722 becomes the outer columnar portion 732 by being cured. The hole portions 731a are formed by the first positioning pin 821 and the second positioning pin 822 of the second mold 82, respectively.

Figure 10:
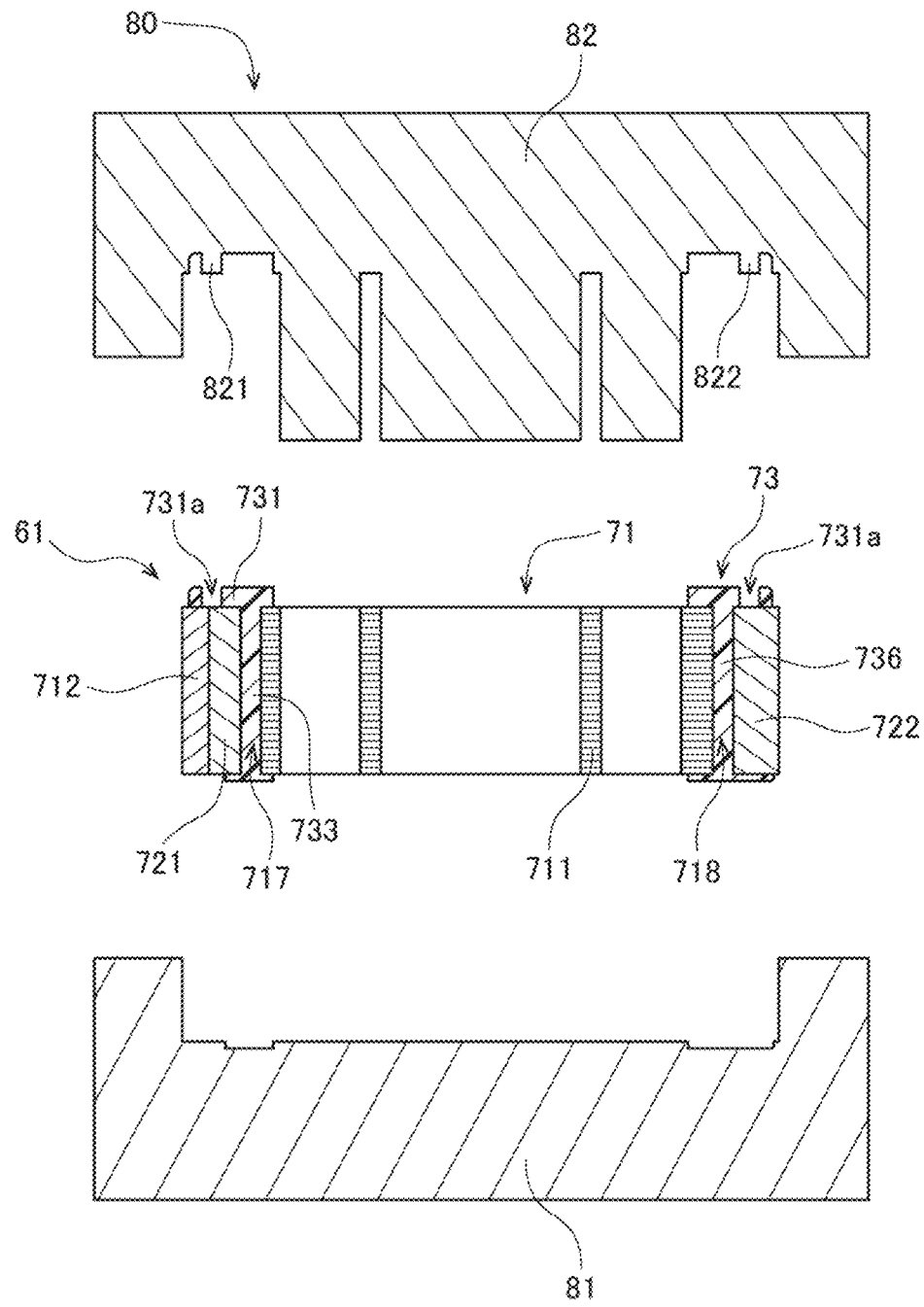
FIG. 10 is a longitudinal sectional view illustrating a state in which the first rotor is manufactured.

After the molten resin 730 is cured, as illustrated in FIG. 10, the mold 80 is opened. Then, the first rotor 61 including the main core 711, the four sub cores 712, the four first magnets 721, the four second magnets 722, and the holder 73 is released from the first mold 81 and the second mold 82 (fourth process).

As described above, in the rotor 32 of the motor 1, the first inner pressing portion 733 of the holder 73 presses the first magnet 721 from the radially inside of the first magnet 721 to the radially outside. Further, the second inner pressing portion 736 of the holder 73 presses the second magnet 722 from the radially inside of the second magnet 722 to the radially outside. Accordingly, the first magnet 721 and the second magnet 722 are accurately positioned for the rotor core 71. As a result, it is possible to suppress the variation in the positioning accuracy of the first magnet 721 and the second magnet 722 among the products.

In addition, in the structure of the present example embodiment, the first inner pressing portion 733 of the holder 73 presses the sub core 712 radially outward with the first magnet 721 therebetween. Thereby, the sub core 712 is accurately positioned for the main core 711. As a result, it is also possible to suppress the variation in the positioning accuracy of the sub core 712 among the products.

Although the example embodiment of the present disclosure is described above, the present disclosure is not limited to the above-described example embodiment. Hereinafter, various modifications will be described focusing on the different points from the above-described example embodiment.

Figure 11:
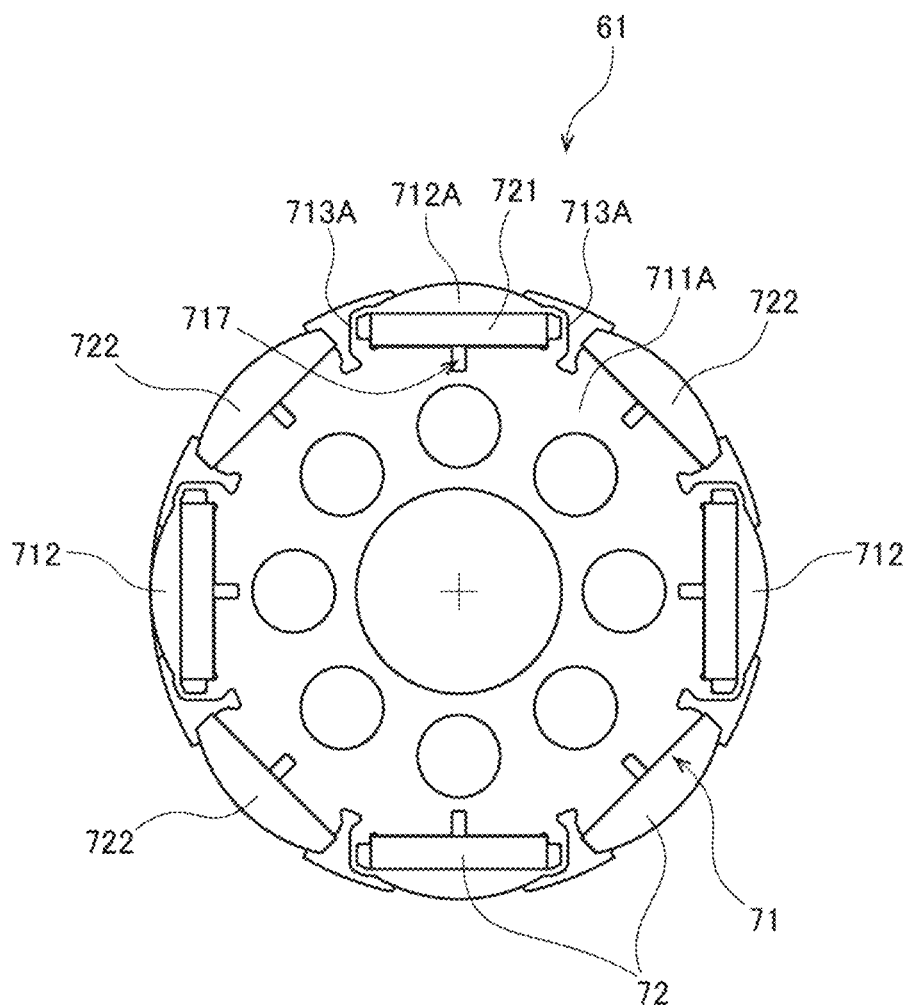
FIG. 11 is a cross-sectional view of a first rotor according to First Modification.

First Modification FIG. 11 is a cross-sectional view of the first rotor 61 according to First Modification. In the example in FIG. 11, the rotor core 71 is not divided into the main core 711 and the sub cores 712. The rotor core 71 has an inner core portion 711A corresponding to the main core 711 of the above-described example embodiment, and four outer core portions 712A corresponding to the sub cores 712. Both end portions of the outer core portion 712A in the circumferential direction are connected to the inner core portion 711A by thin-walled connecting portions 713A, respectively.

In this example, in the second process, the molten resin 730 filled in the first groove 717 presses the inner surface of the first magnet 721 in the radial direction. Accordingly, each of the first magnets 721 is pressed radially outward toward the outer core portion 712A. As a result, the first magnet 721 is accurately positioned in the radial direction for the rotor core 71.

In the above-described example embodiment, the four first magnets 721 and the four second magnets 722 are fixed to the one rotor cores 71. However, the number of the first magnets 721 fixed to the one rotor core 71 may be one to three, or may be five or more. Also, the number of the second magnets 722 fixed to the one rotor core 71 may be one to three, or may be five or more.

In the above-described example embodiment, the first magnets 721 and the second magnets 722 are alternately arranged one by one in the circumferential direction. However, an arrangement mode of the first magnets 721 and the second magnets 722 is not limited thereto. For example, the one first magnet 721 and the two second magnets 722 may be alternately arranged in this order in the circumferential direction.

In addition, in the above-described example embodiment, the rotor 32 is constituted by the first rotor 61 and the second rotor 62, which are the upper and lower two stage rotors. However, the rotor 32 may be only one stage rotor or may be constituted by three or more stage rotors.

Further, the detailed shape of each member constituting the motor may be different from the shape illustrated in each drawing of the present application. The respective elements described in the above example embodiment and the modifications may be combined as appropriate within a range that does not cause a contradiction.

The present disclosure can be used for a holder, a rotor, a motor, and a method for manufacturing the rotor.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A holder comprising:
a body made of resin to position a rotor core which is annular and centered about a central axis, a first magnet in which both a radially inner surface and a radially outer surface are covered with the rotor core, and a second magnet in which a radially inner surface is covered with the rotor core and a radially outer surface is exposed from the rotor core;
an outer columnar portion covering a portion of the radially outer surface of the second magnet;
a first inner pressing portion to press the first magnet radially outward from a radially inner side of the first magnet; and
a second inner pressing portion to press the second magnet radially outward from a radially inner side of the second magnet.

2. The holder according to claim 1, wherein the first inner pressing portion extends in a columnar shape along an axial direction on the radially inner side of the first magnet.

3. The holder according to claim 1, wherein the second inner pressing portion extends in a columnar shape along an axial direction on the radially inner side of the second magnet.

4. The holder according to claim 1, wherein
the outer columnar portion includes a recessed portion between the first magnet and the second magnet in a circumferential direction; and
a circumferential end surface of the first magnet is exposed to the recessed portion.

5. The holder according to claim 1, wherein
the outer columnar portion includes a recessed portion located between the first magnet and the second magnet in a circumferential direction; and
a circumferential end surface of the second magnet is exposed to the recessed portion.

6. The holder according to claim 1, wherein the rotor core includes:
a main core; and
a sub core independent from the main core;
the main core is located radially inward of the first magnet and the second magnet; and
the sub core is located radially outward of the first magnet;
the outer columnar portion includes a recessed portion located between the first magnet and the second magnet in a circumferential direction; and
a circumferential end surface of the sub core is exposed to the recess.

7. A rotor comprising:
the holder according to claim 1;
the rotor core;
a plurality of the first magnets; and
a plurality of the second magnets.

8. The rotor according to claim 7, wherein the first magnets and the second magnets are alternately arranged in a circumferential direction.

9. The rotor according to claim 8, further comprising:
a first rotor and a second rotor arranged in an axial direction; wherein
the first rotor and the second rotor each include the rotor core, the plurality of first magnets, and the plurality of second magnets; and
circumferential positions of the first magnets and the second magnets in the first rotor and circumferential positions of the first magnets and the second magnets in the second rotor are different from each other.

10. The rotor according to claim 7, wherein
the rotor core includes:
a main core;
a plurality of sub cores independent from the main core;
the main core is located radially inward of the first magnets and the second magnets; and
the sub cores are located radially outward of the first magnets.

11. The rotor according to claim 7, wherein the rotor core includes:
a first groove extending in an axial direction on the radially inner side of corresponding one of the first magnets; and
the first inner pressing portion is located inside the first groove.

12. The rotor according to claim 11, wherein
the rotor core includes a first holding surface located radially inward of corresponding one of the first magnets; and
the first groove is located at a center of the first holding surface in a circumferential direction.

13. The rotor according to claim 7, wherein the rotor core includes:
a second groove extending in an axial direction on the radially inner side of corresponding one of the second magnets; and
the second inner pressing portion is located inside the second groove.

14. The rotor according to claim 13, wherein
the rotor core includes a second holding surface located radially inward of corresponding one of the second magnets; and
the second groove is located at a center of the second holding surface in a circumferential direction.

15. A motor comprising:
the rotor according to claim 7; and
an annular stator located radially outside the rotor.

16. A holder comprising:
a body made of resin to position a rotor core which is annular and centered about a central axis, a plurality of first magnets in which both a radially inner surface and a radially outer surface are covered with the rotor core, and a plurality of second magnets in which a radially inner surface is covered with the rotor core and a radially outer surface is exposed from the rotor core;
a first inner pressing portion to press the first magnets radially outward from a radially inner side of the first magnets; and
a second inner pressing portion to press the second magnets radially outward from a radially inner side of the second magnet; wherein
the rotor core includes:
  a first groove extending in an axial direction on the radially inner side of corresponding one of the first magnets; and
  the first inner pressing portion is located inside the first groove.

17. The rotor according to claim 16, wherein
the rotor core includes a first holding surface located radially inward of corresponding one of the first magnets; and
the first groove is located at a center of the first holding surface in a circumferential direction.

18. A holder comprising:
a body made of resin to position a rotor core which is annular and centered about a central axis, a plurality of first magnets in which both a radially inner surface and a radially outer surface are covered with the rotor core, and a plurality of second magnets in which a radially inner surface is covered with the rotor core and a radially outer surface is exposed from the rotor core;
a first inner pressing portion to press the first magnet radially outward from a radially inner side of the first magnet; and
a second inner pressing portion to press the second magnet radially outward from a radially inner side of the second magnet; wherein
the rotor core includes:
  a second groove extending in an axial direction on the radially inner side of corresponding one of the second magnets; and
  the second inner pressing portion is located inside the second groove.

19. The rotor according to claim 18, wherein
the rotor core includes a second holding surface located radially inward of corresponding one of the second magnets; and
the second groove is located at a center of the second holding surface in a circumferential direction.

* * * * *